United States Patent [19]
Johnson

[11] 3,838,588
[45] Oct. 1, 1974

[54] APPARATUS FOR SETTING UNTHREADED PULL RIVETS

[76] Inventor: Andrew L. Johnson, 5346 Greenleaf N., Skokie, Ill. 60076

[22] Filed: July 23, 1973

[21] Appl. No.: 381,429

Related U.S. Application Data

[63] Continuation-in-part of Ser. No. 143,407, May 14, 1971, abandoned.

[52] U.S. Cl. .................................. 72/114, 29/526
[51] Int. Cl. .............................................. B21j 15/26
[58] Field of Search ........ 72/114, 391; 29/509, 526, 29/523, 522

[56] References Cited
UNITED STATES PATENTS

| | | | |
|---|---|---|---|
| 2,384,321 | 9/1945 | Lees | 29/526 |
| 2,437,191 | 3/1948 | Gill | 72/114 |
| 2,583,733 | 1/1952 | Fischer | 72/114 |
| 2,723,777 | 11/1955 | Amtsberg | 72/114 |
| 3,193,921 | 7/1965 | Kahn | 29/509 |
| 3,197,987 | 8/1965 | Martin | 72/114 |

Primary Examiner—Charles W. Lanham
Assistant Examiner—Gene P. Crosby
Attorney, Agent, or Firm—Darbo, Robertson & Vandenburgh

[57] ABSTRACT

A tool for threading a hollow, unthreaded rivet is held in the spindle of a driver or power head. Through a first clutch an electric motor rotates the spindle to thread the tool into the rivet. Thereafter, the first clutch is desengaged and a second clutch is engaged between the spindle and the frame to hold the spindle stationary. At the same time, a third clutch is engaged to drive a nut from the electric motor. The nut is threaded on the spindle and has an extension which forms an abutment against the rivet head. As the nut is driven it is forced by the threads in a direction such that the abutment presses against the rivet head and a relative motion of the threaded tool up towards the abutment pulls the rivet to form a bulge around the shank of the rivet to lock the rivet in place.

19 Claims, 8 Drawing Figures

PATENTED OCT 1 1974 3,838,588
SHEET 1 OF 3

APPARATUS FOR SETTING UNTHREADED PULL RIVETS

RELATED APPLICATION

This application is a continuation-in-part of my pending application Ser. No. 143,407, filed May 14, 1971, now abandoned.

SUMMARY OF THE INVENTION

The present invention relates to an unthreaded rivet, a tool for threading the rivet while simultaneously obtaining an engagement therewith and a power head for effecting the threaded engagement and thereafter applying a compressive force to complete the riveting operation.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
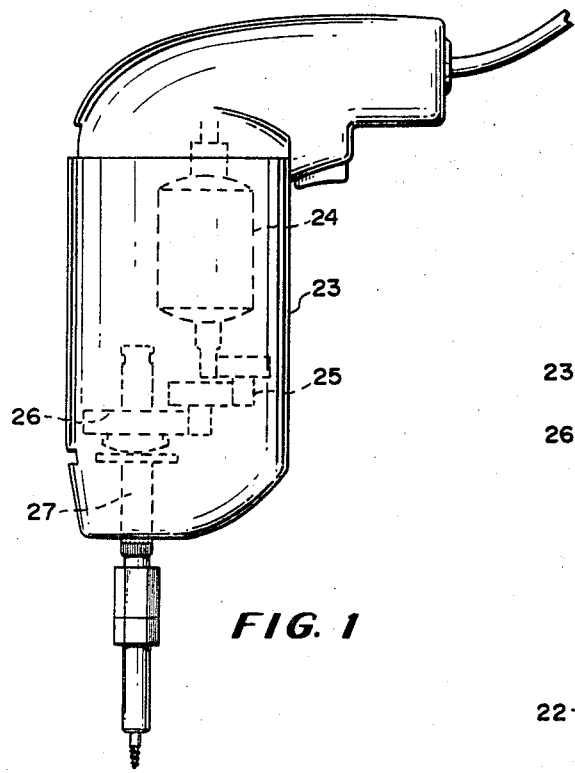
FIG. 1 is an elevational view of an embodiment of the invention.
Figure 3:
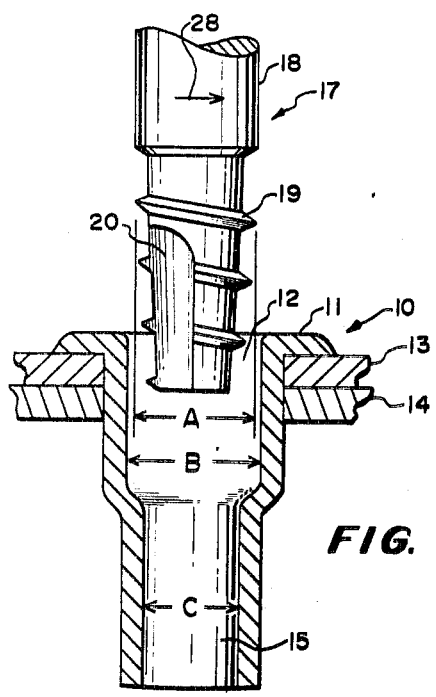
FIG. 3 is an enlarged cross-sectional view of the rivet and the tool for threading and pulling the rivet.

The present invention contemplates the use of a rivet, generally 10. It is a solid of revolution having a head 11 at one end thereof in the form of an outwardly extending flange. Commencing from the flange end is an internal opening 12 which is of a comparatively large diameter and is of an axial length substantially longer than the thickness of the two pieces of metal 13 and 14 which are to be secured by the rivet. Referring to FIG. 3 it will be seen that opening 12 has a diameter B. Coaxial with the opening 12 is a portion having a smaller diameter opening 15. It has a predetermined diameter C which is substantially less than the diameter B.

For engaging and pulling this rivet a tool, generally 17, is employed. This tool has a shank 18. The distal end of the tool has an external thread 19 which is of an increasingly smaller diameter as it approaches the distal end. These threads are interrupted by a notch 20 extending along the outside in an axial direction. This forms a thread cutting tool for making internal threads in the rivet and thereby engaging the rivet. The size of the thread cutting portion of the tool is dimensioned in accordance with the internal openings in the rivet (or vice versa). For example, the dimension B would be 0.140 inches while the dimension C would be 0.106 inches. The rivet would have a wall thickness of about 0.26 inches. The dimension A of the tool would be about 0.135 inches. The maximum root diameter of the tool would be 0.100 inches. The thread 19 would take the form of an American National 60° thread.

The power head or rivet driver, generally 22, includes a frame 23 in the form of a housing. Within this frame is an electric motor indicated by the rotating armature 24. Through a speed reduction gearing system 25 (the details of which are unimportant) the motor drives a gear 26. This gear is assembled to form a unitary part of a sleeve 27 so that the sleeve always rotates in a direction indicated by arrow 28 as a result of the rotation of the electric motor. The sleeve is suitably journaled in the frame 23 and would normally be provided with antifriction bearings (not shown).

Figure 2:
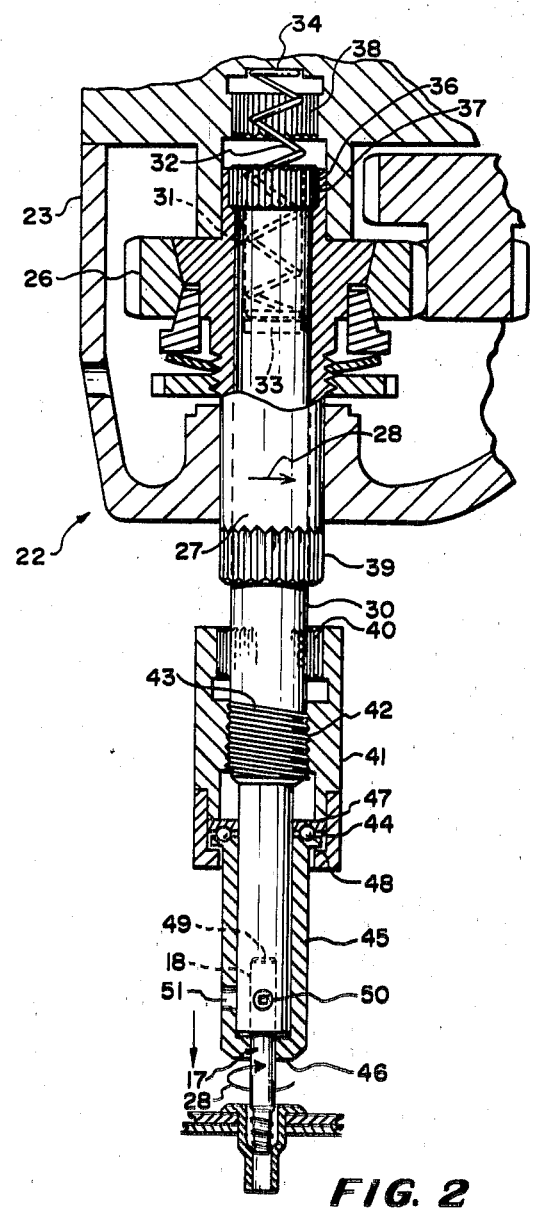
FIG. 2 is an enlarged cross-sectional view of the operative end of the embodiment of FIG. 1.

A spindle 30 is journaled within the sleeve 27. At its proximal end, the spindle 30 has a pocket 31 within which a compression spring 32 is positioned. One end of the spring bears against a rotatable bearing 33 and the other end is received in an annular recess 34 in frame 23. This spring thus urges the spindle to the position illustrated in FIG. 2. The proximal end of the spindle 30 also comprises a splined head 36 which, in FIG. 2, is received in a splined socket 37 in the sleeve 27. Aligned with the splined head 36 is a second splined socket 38 forming a part of the frame 23.

At the distal end, the sleeve 27 has a male spline 39. This is of a size to engage a female spline 40 at the end of a nut 41. Nut 41 has internal threads 42 which engage threads 43 on the spindle 30. A housing 45 defines an abutment 46 at the distal end thereof. The proximal end of the housing is in the form of an antifriction flange 44 which is received between a pair of abutments 47 and 48 in the nut 41. The distal end of the spindle 30 defines a chuck for holding the tool 17. To this end the tool is received in a cavity 49 and held in place by a set screw 50. Access to the set screw is obtained through an opening 51 in housing 45.

Before commencing operation, the tool is, of course, mounted in the driver. The end of the tool is then brought together with the rivet in the manner illustrated in FIGS. 2 and 3. The rivet is held against rotation, which may be done by merely grasping it with a pair of pliers. Often it is most convenient to do this before the rivet has been inserted into the work 13, 14. In some situations the rivet may be keyed to the work to prevent its rotation.

In any event, the motor 24 is then energized so that the seleve 27 commences rotation in the direction indicated by arrow 28. Due to the fact that the clutch formed by head 36 and socket 37 is engaged the spindle rotates with the sleeve. When the tool has been threaded into the rivet and the rivet is inserted into the hole, the operator then presses on the rivet driver 22 in the direction of the work. This is done while the motor 24 is deenergized. The result is that the spindle 30 moves longitudinally so that head 36 is moved out of socket 37 and into socket 38. Thus, head 36 and socket 38 form a clutch (the second clutch) which is now effective to hold the spindle 30 in a stationary position. The same movement of the spindle causes the socket with its female spline 40 to move over the male spline 39 on sleeve 27. This acts as a clutch (the third clutch) which is now engaged to cause nut 41 to rotate with sleeve 27. The position of the latter two clutches is that illustrated in FIG. 4. The motor is turned on to rotate sleeve 27. Since nut 41 is rotating and spindle 30 is stationary, the threads 42, 43 cause the nut to move outwardly, i.e., the relative motion is such that the tool 17 is drawn inwardly through the end abutment 46 of housing 45. Since the end abutment 46 is pressing against the rivet flange and the tool 17 is pulled inwardly through the abutment, the tool draws the small end of the rivet towards the rivet head and an intermediate portion of the rivet bulges outwardly to form a rear flange 55. Thus the work pieces 13 and 14 are securely held between flanges 55 and 11. The housing 45 can remain non-rotating due to the antifriction flange 44. Now rotating the motor in the reverse direction results in the compression force being released from the rivet and, after returning the spindle to the FIG. 2 position, the tool is unthreaded from the rivet.

An important advantage of the present invention over the use of conventional threaded rivets is a very substantial saving in cost. Rivets of the present invention, which do not require internal threading as a part of the manufacturing process, can be made much more inexpensively than can the conventional rivets. Yet, so far as their application is concerned, it is no more time-consuming for an operator to do a riveting job using embodiments of the present invention than it is to set threaded rivets using conventional rivet setters.

It is important that the sleeve 27 of the rivet driver rotate at a relatively low speed and with comparatively high torque. It is, of course, achieved by the reduction gearing 25.

Figure 4:
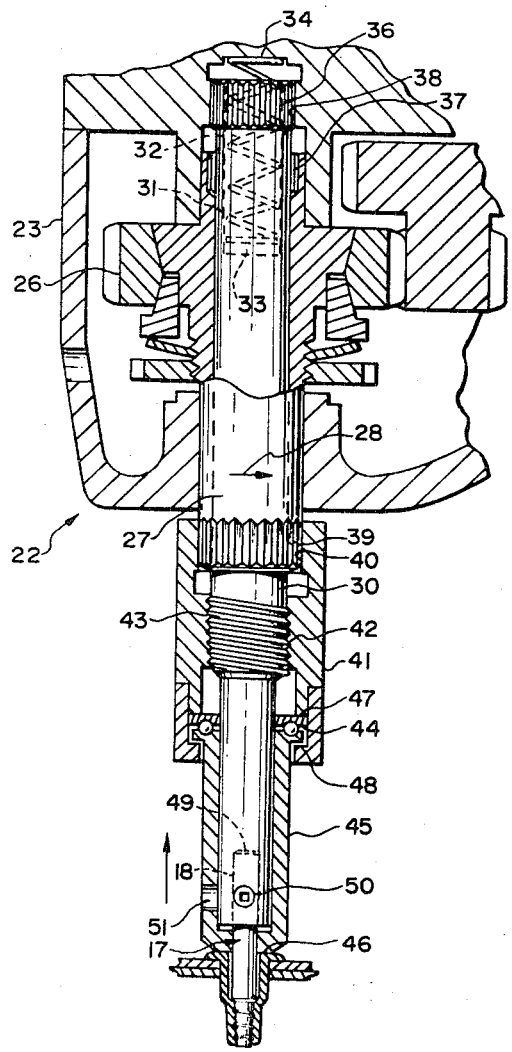
FIG. 4 is a view corresponding to FIG. 2 but showing the rivet after threading and preparatory to pulling the rivet.
Figure 5:
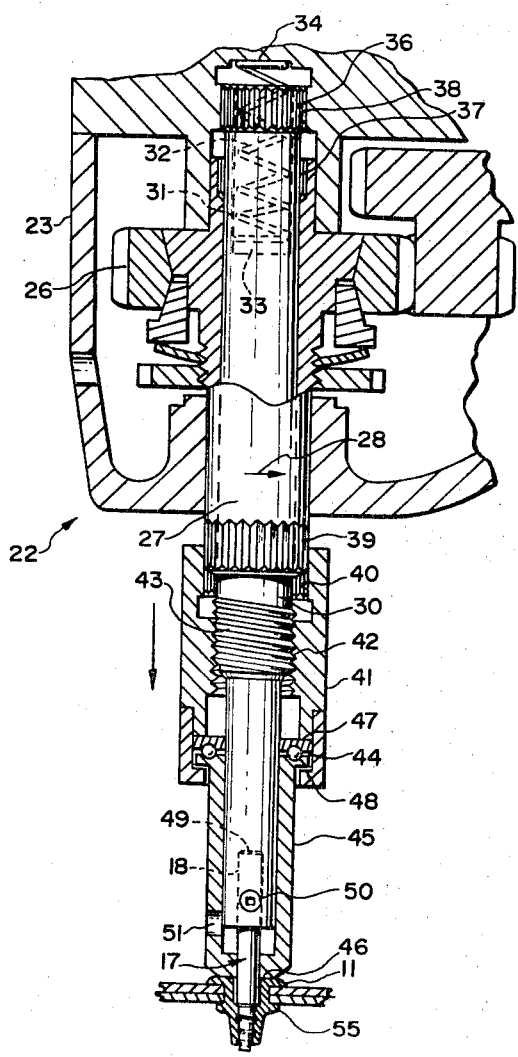
FIG. 5 is a view corresponding to FIG. 4 after the rivet has been pulled.
Figure 6:
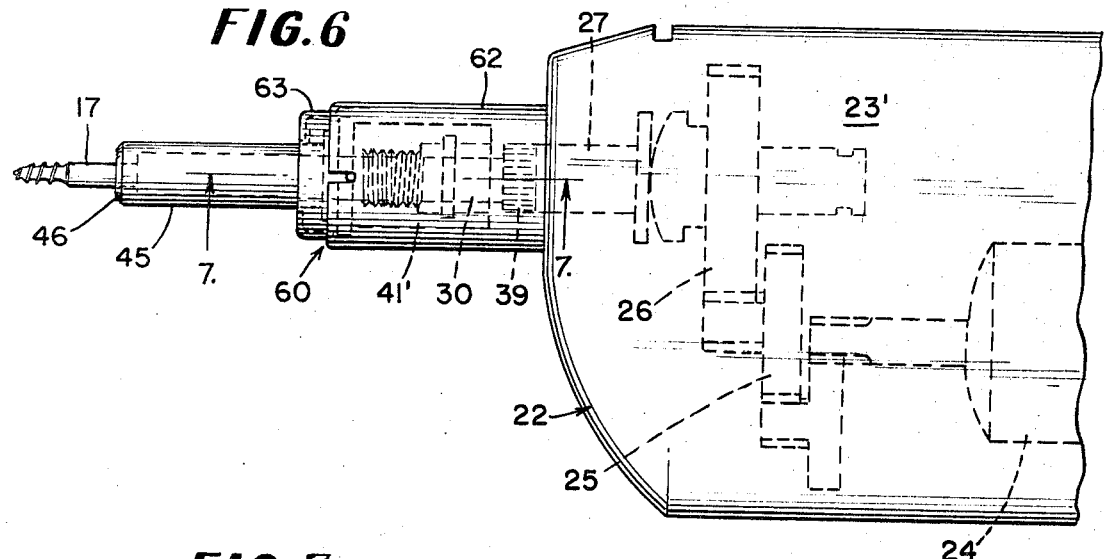
FIG. 6 is a fragmentary elevational view illustrating an additional improvement comprising a one-way brake for the nut.
Figure 7:
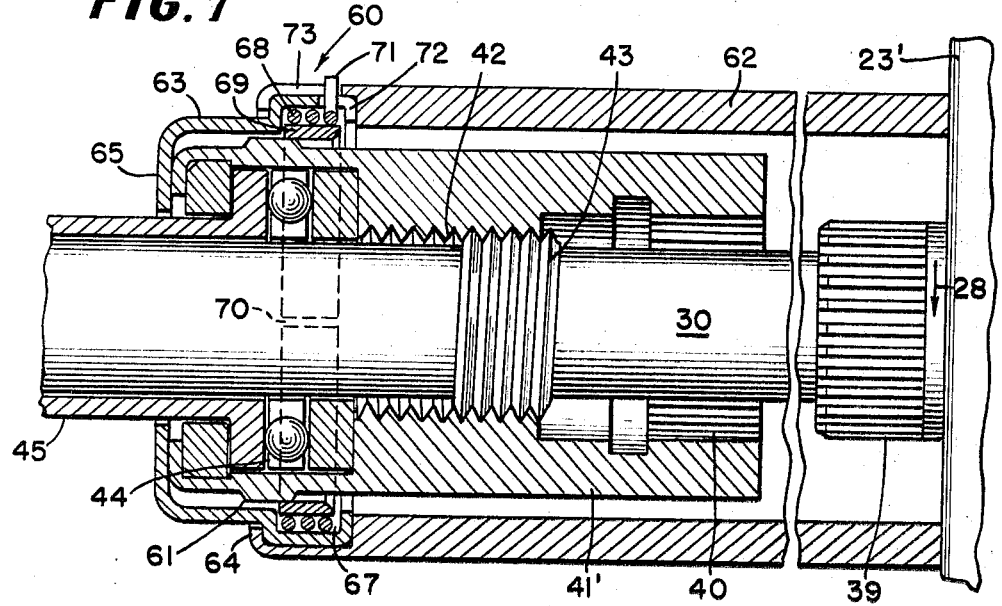
FIG. 7 is an enlarged longitudinal view of the brake of FIG. 6 as seen at line 7—7 of FIG. 6 with the nut in one portion.
Figure 8:
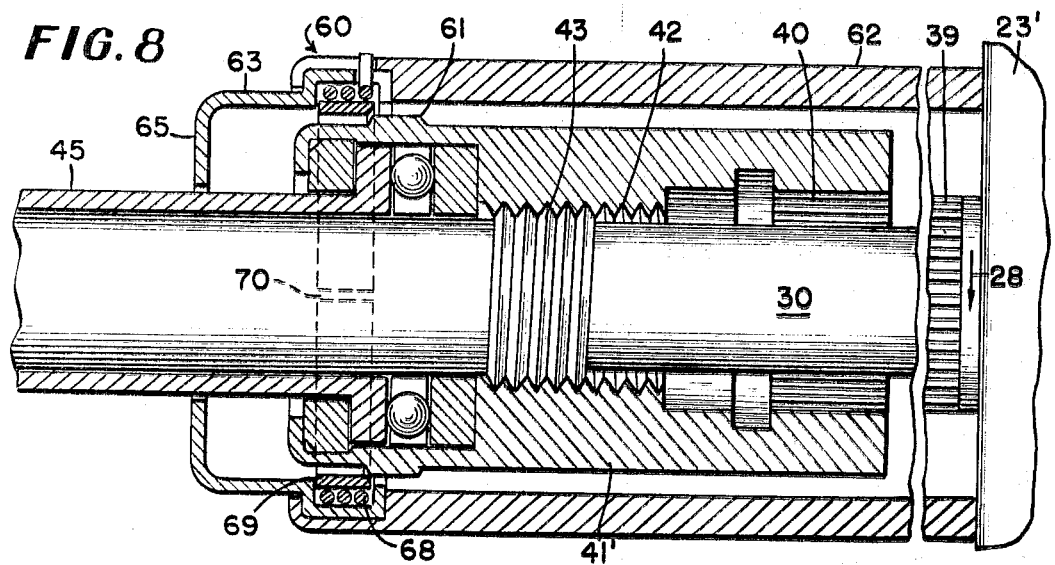
FIG. 8 is a view corresponding to FIG. 7 with the nut in another position.

The embodiment of FIGS. 6–8 is essentially the same as the previously described embodiment except that a brake has been added to facilitate returning the nut to its original position after one rivet has been drawn and preparatory to the succeeding application of a rivet. In the previously described embodiment a manual manipulation is required to return the spindle 30 from the relative position between threads 42 and 43 as illustrated in FIG. 5, to the relative position between threads 42 and 43 as illustrated in FIG. 4. To achieve this without manual manipulation, a one-way brake, generally 60, has been added.

In the embodiment of FIGS. 6–8 the same numbers have been applied to corresponding parts. To form a part of the brake, the nut 41' has been modified by adding an annular land 61 thereto. A cage formed by sleeve 62 and sleeve projection 63 has been added to frame 23' and positioned coaxial with the spindle 30. Fitted into a recess at the end of sleeve 62 is the sleeve projection 63. As will be apparent to those skilled in the art, this cage is formed in two pieces to facilitate inserting the brake 60 into the sleeve. The end of the sleeve 62 is rolled over after assembly to form a flange 64 holding the sleeve projection 63 in place. The sleeve projection has a flange 65 at the end thereof positioned in a radial plane with respect to the spindle 30.

Sleeve projection 63 defines an annular groove 67 within which is a spring 68 and a brake band 69. The brake band 69 is annular, except for the fact that at one point about its circumference it has a slot 70 thereacross so as to permit it to readily expand and contract. The spring has an end 71 which projects out through slots 72 and 73 in sleeve projection 63 and sleeve 62 respectively. The spring is wound in a direction such that when the nut 41' is rotating in the direction indicated by arrow 28 (herein called the "forward" direction), the rotation (transmitted to spring 68 by the friction between land 61, brake band 69 and spring 68) will tend to tighten spring 68 thus increasing the friction between those three parts. When the rotation of nut 41' is in the direction opposite of arrow 28 (herein called the "reverse" direction) that rotation as transmitted to spring 68 by reason of the friction between the three parts tends to expand spring 68, thus causing the brake to slip easily.

At the start of a rivet application cycle, the parts will be in the relative position illustrated in FIG. 8. There is just a slight gap (in an axial direction) between land 61 and brake band 69, the brake thereby being disengaged. The tool 17 on the end of spindle 30 is inserted into a rivet. The motor is then turned on in the "forward" direction and spindle 30 rotates in the direction 28. This causes the tool 17 to screw into the rivet. Since the brake 60 is disengaged, the nut 41' is free to rotate with spindle 30, which it does.

The rivet is then inserted into the opening in the parts to be connected thereby. The frame 23 is pressed towards these parts which causes the spindle and nut to shift from the FIG. 2 to the FIG. 4 position. Thereby splines 39 and 40 engage. The motor is again operated in the "forward" direction. Since spindle 30 is locked against rotation and nut 41' is rotated in the direction of arrow 28 because of its engagement with sleeve 27, the nut 41' moves to the left (as seen in FIGS. 7 and 8) with respect to spindle 30 and the sleeve 62. Thus, land 61 moves relatively closer to brake band 69. The rivet has now been driven; the motor is shut off; and the pressure (to the left in FIG. 6) manually applied to frame 23 is released. This release of pressure causes spindle 30 to move outwardly with respect to frame 23' (axially to the left in FIGS. 6 and 8). It carries nut 41' with it during that axial movement. At the end of that axial movement the land 61 has entered within and come into contact with brake band 69.

The motor now is driven in the "reverse" direction so that spindle 30 rotates in the opposite of the direction indicated by arrow 28. The purpose of doing so is to disengage the tool 17 from the rivet which has been set as illustrated in FIG. 5. During this reverse rotation there is a light frictional engagement between land 61, brake band 69, and spring 68. This frictional engagement is sufficient to hold the nut 41' stationary, and thereby cause it to move axially to the left (as seen in FIGS. 7 and 8) with respect to spindle 30 until the end of the nut contacts flange 65. This position is illustrated in FIG. 7. When that contact occurs the nut can move no further and slippage occurs between the brake band 69 and the land 61. When the tool 17 is fully disengaged from the rivet 55 this reverse rotation is then stopped by a suitable operation of the manual control switch for the electric motor. The motor is then run briefly in the "forward" direction, which brief operation can be the start of the operation of picking up another rivet as previously described. During this short period of forward operation there is a strong engagement between land 61 and brake band 69 holding the nut rotationally stationary. Thus the relative rotation between threads 42 and 43 causes the nut to move to the right (as seen in FIGS. 7 and 8) with respect to spindle 30. This axial movement of the nut occurs until land 61 passes beyond brake band 69. Thereupon the nut 41' is free to rotate with the spindle 30 so that no further axial movement of the nut occurs. The nut 41' has now returned to the starting position illustrated in FIG. 8.

I claim:

1. A riveting apparatus for setting a rivet having a head at one end and an opening extending axially of the rivet from said one end, at least a part of said opening having a predetermined diameter and free of threads, said apparatus comprising:
   a tool having a shank at one end and adjacent said shank having means for cutting threads in a part having an opening of said predetermined diameter and upon completion of that operation said threads being engaged and;
   a rivet driver including:
      a frame,
      a spindle rotatably mounted in said frame,
      a chuck on the distal end of said spindle to be rotated thereby, said chuck being of a size to hold said shank with said means being spaced from the distal end of the chuck,
      means defining an abutment between the chuck and the thread cutting means, and
      power means on said frame and operatively connected to said spindle and said abutment means for first rotating said tool in a direction such that it threadedly engages said rivet and second will decrease the space between said thread cutting means and said abutment to apply a compressive force to said rivet.

2. An apparatus as set forth in claim 1, wherein said driver comprises:
   a sleeve rotatably mounted in said frame and connected to said power means to be rotated thereby, said spindle being movably mounted in said sleeve;
   first clutch means operatively connecting the sleeve and the spindle for concurrent rotation and being disengageable so that the spindle will not rotate with the sleeve;
   second clutch means operable upon the disengagement of the first clutch means for connecting the spindle to the frame to lock the spindle against rotation;
   said abutment defining means including a nut on said spindle and threadibly connected to said spindle; and
   third clutch means also operable upon the disengagement of the first clutch means for connecting the nut to the sleeve to be rotated thereby with respect to the stationary spindle.

3. An apparatus as set forth in claim 2, wherein said spindle is movable longitudinally in said sleeve from a first position at which said first clutch means is engaged and the second and third clutch means are disengaged to a second position at which said first clutch means is disengaged and the second and third clutch means are engaged.

4. An apparatus as set forth in claim 3, wherein said abutment defining means includes a part defining the abutment which part is rotatable with respect to said nut while being constrained for movement with the nut longitudinally of the spindle.

5. An apparatus as set forth in claim 4, wherein the first and second clutch means comprises:
   a splined head on the proximal end of the spindle,
   said sleeve having a splined socket on the proximal end thereof and receiving said splined head in said first position of the spindle,
   said frame having a splined socket aligned with and spaced beyond the proximal end of the sleeve and receiving said splined head in said second position of the spindle.

6. An apparatus as set forth in claim 5, wherein the distal end of the sleeve has a male spline thereon and the adjacent end of the nut has a socket with a corresponding female spline, said adjacent end being spaced from the male spline when the spindle is in said first position and receiving said male spline when the spindle is in said second position.

7. An apparatus as set forth in claim 6, wherein the means for cutting threads moves freely within the opening for a distance commencing at the head end of the rivet toward said predetermined diameter.

8. An apparatus as set forth in claim 1, wherein the means for cutting threads moves freely within the opening for a distance commencing at the head end of the rivet toward said predetermined diameter.

9. A rivet driver for use with a tool having a shank at one end and thread means at the other end, said driver including:
   a frame,
   a spindle rotatably mounted in said frame,
   a chuck on the distal end of said spindle to be rotated thereby, said chuck being of a size to hold said shank with said means being spaced from the distal end of the chuck,
   means defining an abutment between the chuck and the thread means,
   power means on said frame and operatively connected to said spindle and said abutment means for first rotating said tool in a direction such that it threadedly engages said rivet and second will decrease the space between said threading means and said abutment means to apply a compressive force to said rivet,
   a sleeve rotatably mounted in said frame and connected to said power means to be rotated thereby, said spindle being rotatably mounted in said sleeve,
   first clutch means operatively connecting the sleeve and the spindle for concurrent rotation and being disengageable so that the spindle will not rotate with the sleeve,
   second clutch means operable upon the disengagement of the first clutch means for connecting the spindle to the frame to prevent the rotation of the spindle,
   said abutment defining means including a nut on said spindle and threadibly connected to said spindle, and
   third clutch means also operable upon the disengagement of the first clutch means for connecting the nut to the sleeve to be rotated thereby with respect to the stationary spindle.

10. An apparatus as set forth in claim 9, wherein said spindle is movable longitudinally in said sleeve from a first position at which said first clutch means is engaged and the second and third clutch means are disengaged to a second position at which said first clutch means is disengaged and the second and third clutch means are engaged.

11. An apparatus as set forth in claim 10, wherein the first and second clutch means comprises:
a splined head on the proximal end of the spindle,
said sleeve having a splined socket on the proximal end thereof and receiving said splined head in said first position of the spindle,
said frame having a splined socket aligned with and spaced beyond the proximal end of the sleeve and receiving said splined head in said second position of the spindle.

12. An apparatus as set forth in claim 11, wherein the distal end of the sleeve has a male spline thereon and the adjacent end of the nut has a socket with a corresponding female spline, said adjacent end being spaced from the male spline when the spindle is in said first position and receiving said male spline when the spindle is in said second position.

13. An apparatus as set forth in claim 9, wherein said abutment defining means includes a part defining the abutment which part is rotatable with respect to said nut while being constrained for movement with the nut longitudinally of the spindle.

14. A rivet driver as set forth in claim 9, including brake means mounted on said frame for engaging said nut to restrain the nut against rotation when the spindle is rotating in one direction so that the abutment defining means will return to its original position.

15. A rivet driver as set forth in claim 14, wherein said brake means is positioned to engage said nut when the nut is in a second position distant from the frame and to be disengaged from said nut when the nut is in a first position closer to the frame than is said second position.

16. A rivet driver for use with a tool having a shank at one end and thread means at the other end, said driver including:
a frame,
a spindle rotatably mounted in said frame and having a threaded portion,
a chuck on the distal end of said spindle to be rotated thereby, said chuck being of a size to hold said shank with said means being spaced from the distal end of the chuck,
means defining an abutment between the chuck and the thread cutting means and including a nut threadibly engaging said threaded portions, and
power means on said frame and operatively connected to said spindle and said abutment means for first rotating said tool in a direction such that it threadedly engages said rivet and second that there is relative rotation between the spindle and nut in a direction such that the threaded engagement therebetween causes the abutment means to move axially relative to the spindle to decrease the space between the thread means and said abutment to apply a compressive force to said rivet.

17. A rivet driver as set forth in claim 16, including brake means mounted on said frame for engaging said nut to restrain the nut against rotation when the spindle is rotating in one direction so that the abutment defining means will return to its original position.

18. A rivet driver as set forth in claim 17, wherein said brake means is positioned to engage said nut when the nut is in a second position distant from the frame and to be disengaged from said nut when the nut is in a first position closer to the frame than is said second position.

19. A rivet driver as set forth in claim 17, wherein during said relative rotation said power means is connected to rotate said nut, and including means during said relative rotation to engage the spindle and hold it rotationally stationary.

* * * * *